United States Patent [19]

Hensler et al.

[11] 4,251,498

[45] Feb. 17, 1981

[54] PREPARATION OF GRANULAR SODIUM TRIPOLYPHOSPHATE PRODUCTS FROM SCREEN UNDERSIZE SODIUM TRIPOLYPHOSPHATE PARTICLES

[75] Inventors: Paul L. Hensler; Delmar F. Church, both of Lawrence, Kans.; Robert W. Beger, Mount Zion, Ill.

[73] Assignee: FMC Corporation, Philadelphia, Pa.

[21] Appl. No.: 609

[22] Filed: Jan. 2, 1979

[51] Int. Cl.³ ................... C01B 15/16; C01B 25/26
[52] U.S. Cl. ................................. 423/315; 423/305
[58] Field of Search ................................. 423/315, 305

[56] References Cited

U.S. PATENT DOCUMENTS

| | | | |
|---|---|---|---|
| 3,338,671 | 8/1967 | Marschall et al. | 423/315 |
| 3,356,447 | 12/1967 | Tafler et al. | 423/315 |
| 3,384,452 | 5/1968 | Heymer et al. | 423/315 |
| 3,469,938 | 9/1969 | McLeod et al. | 423/315 |
| 3,672,826 | 6/1972 | Hornig et al. | 423/315 |
| 3,761,573 | 9/1973 | Hinz et al. | 423/315 |
| 3,932,590 | 1/1976 | Pals et al. | 423/315 |
| 4,134,963 | 1/1979 | Pals | 423/315 |

*Primary Examiner*—O. R. Vertiz
*Assistant Examiner*—Gregory A. Heller
*Attorney, Agent, or Firm*—Christine M. Miles; F. Ianno

[57] ABSTRACT

Screen undersize sodium tripolyphosphate (STPP) particles are compacted, milled and moisturized by adding a sufficient amount of water thereon to produce a material containing on the average between about 15% and about 35% by weight moisture. The moisturized material is calcined to a temperature within the range of from about 300° to about 600° C., to produce a granular STPP product having a low friability, high absorptivity, and a bulk density within the range of from about 0.65 to about 0.87 g/cc.

31 Claims, No Drawings

PREPARATION OF GRANULAR SODIUM TRIPOLYPHOSPHATE PRODUCTS FROM SCREEN UNDERSIZE SODIUM TRIPOLYPHOSPHATE PARTICLES

The present invention relates to a process for preparing granular sodium tripolyphosphate (STPP) products from an undersize STPP feed material. More particularly, the invention relates to a process for preparing granular STPP products having low friability, high absorptivity, and a bulk density within the range of from about 0.65 to about 0.87 g/cc, wherein there is employed as the feed, screen undersize STPP, typically obtained from the various commercial processes for producing granular STPP.

In the formulation of modern detergent compositions, granular STPP has come into widespread use as a phosphate "builder" which increases the cleaning ability of these detergent compositions. STPP is produced by initially reacting phosphoric acid and an alkaline compound such as sodium hydroxide or sodium carbonate together in an aqueous solution such that the molar ratio of sodium to phosphorus is on the order of about 1.67. This reaction results in the formation of an aqueous mixture containing monosodium orthophosphate and disodium orthophosphate in a mole ratio of about 1:2.

STPP can be produced therefrom in either a rotary kiln or a spray dryer. In the case of the rotary kiln, the free water is removed from the phosphate mixture by passing it through a heating zone where it is progressively heated to higher temperatures. At a temperature of about 250° C. or higher, STPP is formed.

In the case of the spray dryer, the aqueous mixture of orthophosphates is dried to a predominately orthophosphate material which can be subsequently calcined in, for example, a rotary kiln or fluid bed calciner to form STPP. It is also possible to produce STPP directly from the spray dryer if it is suitably constructed.

While the exact mole ratio of sodium to phosphorus in the aqueous orthophosphate solution which is employed may be varied, the ultimate reaction takes place in accordance with the following equation:

$$NaH_2PO_4 + 2Na_2HPO_4 \rightarrow Na_5P_3O_{10} + 2H_2O$$

The resulting STPP is a crystalline anhydrous product capable of having two physical forms. Form I is typically produced when calcination temperatures of from about 500° C. to about 600° C. are employed while Form II is typically produced when calcination temperatures below about 500° C. are employed.

In formulating free-flowing, essentially homogeneous detergent compositions containing a granular STPP product, the STPP employed has been manufactured so that its various physical properties suit the ultimate use of the formulation and/or the method by which the formulation is prepared. Physical properties of a granular STPP product which are generally important in preparing such compositions include bulk density, friability and absorptivity.

Bulk density may be defined in terms of the weight of STPP which freely flows into a container of given volume. A convenient method for measuring bulk density, and the method used herein is the Solvay Process Method 302A described in the Solvay Technical and Engineering Service Bulletin No. 9, (page 33) issued in 1944. Typically, the low bulk density product (generally 0.45-0.59 g/cc) is used in home laundry and pre-soak detergent formulations. Medium density STPP is generally used in automatic dishwashing compositions, and the higher density product (generally greater than 0.75 g/cc) is used in formulating heavy-duty cleaners as, for example, floor and wall cleaners.

Friability relates to particle strength: the lower the percent friability, the stronger the STPP particle. Generally, particles of low friability are desired to prevent fracturing of the STPP particles during mixing, handling and transporting the detergent formulations. Friability values below 30% are generally desired for commercial use. Values below 20% are considered good and below 10% excellent.

Absorptivity relates to the ability of a particle to absorb various liquid components employed in the formulation of detergent compositions. High absorptivity values are a critical factor, for example, in formulating free-flowing detergent compositions which contain liquid surfactants, as dry mixed automatic dishwashing compositions. Absorptivity values above 10% are generally desired in formulating such compositions. Values above 15% are considered very good and above 20% excellent.

The procedures employed in measuring friability and absorptivity are detailed below, immediately preceding Example I.

Various processes are known for preparing granular STPP from screen undersize STPP. U.S. Pat. No. 3,932,590 discloses one such process which produces a granular STPP product having a bulk density within the range 0.50-0.80 g/cc and an improved particle strength. The process involves spraying an aqueous sodium orthophosphate solution onto the rotating feed until the amount of dissolved solids sprayed is between 8-15% by weight (based on the weight of the STPP to be produced) and calcining the resulting agglomerate. Products commercially produced by this process have an absorptivity typically on the order of 13-16%.

Although STPP products of such absorptivity values are suitable in formulating many types of detergent compositions, higher absorptivity values are more desirable in formulating free-flowing detergent compositions containing liquid surfactants.

U.S. Pat. No. 3,761,573 likewise discloses production of a granular STPP product of "high abrasion resistance" from an undersize STPP feed. According to the disclosure, the feed is agglomerated with a specifically defined orthophosphate liquor, followed by drying, sizing and separately calcining the STPP agglomerate thus produced. The process, however, is limited to the production of a product having a density greater than 0.75 g/cc (typically 0.89-0.95 g/cc) from apparently only a spray dried STPP undersize feed material.

Consequently, a process which produces granular STPP products having low friability, high absorptivity and a bulk density within the range of from about 0.65 to about 0.87 g/cc is desirable. Such a process which also uses a spray dried or rotary dried screen undersize STPP feed material is especially desirable.

In this latter regard, there are two important considerations. First, all processes for producing granular STPP also produce undersize material which must be screened off. This material may be recycled if the process permits, or milled to produce powdered STPP and sold as such. Presently, however, the demand in the industry for granular STPP is increasing at a greater rate than that for powder, and manufacturers are faced with the problem of disposing of the excess powder.

Secondly, many existing plant facilities have a limited ability for producing more than one bulk density range of granular STPP. This is the case with most rotary kiln processes, which typically produce a product having a bulk density of about 0.90–1.00. g/cc. A process utilizing screen undersize STPP feed, to which existing plants could easily adapt, would therefore advantageously increase the granular yields of such plants and in certain instances, additionally increase flexibility in the bulk density of the product.

The present invention provides a process for producing granular STPP products having low friability, high absorptivity and a bulk density within the range of from about 0.65 to about 0.87 g/cc utilizing a rotary or spray dried screen undersize STPP feed material. In providing a product having the aforesaid physical characteristics, the process increases a producer's ability to formulate detergent compositions tailored for specific uses. The process, in utilizing a screen undersize STPP feed material, enables existing commercial facilities which produce granular STPP to increase their granular yield and further provides greater flexibility in the bulk density range of granular STPP that can be produced in certain types of facilities, for example, most facilities utilizing rotary kiln processes.

It has been discovered that a granular sodium tripolyphosphate product having low friability, high absorptivity, and a bulk density within the range of from about 0.65 g/cc to about 0.87 g/cc can be prepared by a process which comprises compacting screen undersize sodium tripolyphosphate particles, milling the compacted particles, recovering a compacted and milled feed having a particle size distribution of at least 15% by weight +50 mesh, 0 to 50% by weight −50 +100 mesh and 0 to 50% by weight −100 mesh, moisturizing the compacted and milled feed by adding a sufficient amount of water thereon to produce a moisturized material containing on the average between 15 and 35% by weight moisture, agitating the material being moisturized, calcining the moisturized material to a temperature within the range of from about 300° to about 600° C. and recovering said granular sodium tripolyphosphate product.

The material fed to the compacting step is a screen undersize, essentially non-hydrated STPP material obtained, for example, from the commercial production of granular STPP by either a spray drying or a rotary kiln process. Generally, screen undersize particles have a size distribution of at least 25% by weight −100 mesh, 0 to 65% by weight −50 +100 mesh and 0 to 10% by weight +50 mesh. Preferably, the compactor feed has at least about 50% by weight −100 mesh particles therein. All particle size designations herein represent U.S. Standard Screen values.

Form I and/or Form II STPP may be employed as the compactor feed. The Form I and II content of the final calcined product is essentially controlled by the material calcination temperature of the moisturized STPP. (There are no Form designations in the hydrated state.)

Typically, only one pass of the screen undersize STPP feed through the compactor is necessary in carrying out the process of the invention. The specific compactor employed is not critical provided that it can apply sufficient pressure to compact the STPP. Compaction pressures on the order of from about 35,000 psig to about 60,000 psig are generally satisfactory.

The compacted particles are then milled and a compacted and milled feed having a size distribution of at least 15% by weight +50 mesh, 0 to 50% by weight −50 +100 mesh and 0 to 50% by weight −100 mesh is recovered. Preferably, the compacted and milled feed recovered has a size distribution of 40 to 85% by weight +50 mesh, 10 to 30% by weight −50 +100 mesh and 15 to 40% by weight −100 mesh. The compacted and milled feed is preferably an unscreened material. The feed may, however, be a screened material if, for example, less fines are desired therein than are present in the unscreened material.

The material fed to the moisturization step may be the compacted and milled feed alone, or it may additionally contain process undersize STPP which has been recycled to the moisturization step. Such recycle is preferably done when a continuous process is employed. Process undersize material is understood herein to constitute product screen undersize STPP and STPP particles (generally partially hydrated) collected from the hydrator and/or calciner exit gas streams by, for example, a dry cyclone.

In carrying out the process of the invention, a sufficient amount of water is added to the moisturization step feed to produce a product containing, on the average, between 15 and 35% by weight of moisture. The 15–35% amount of moisture, represents both bound and free water. Generally, the moisturization step effects an agglomeration of the hydrator feed, particularly of any fines (that is, −100 mesh material) in said feed.

Both the amount of water added and the particle size of the moisturization step feed have been found to be factors in controlling the bulk density of the final product, the former appearing to be the more significant factor. Up to a point, increasing the amount of water added to the moisturization step feed tends to decrease the bulk density of the final product. This effect is thought to diminish and eventually reverse itself when sufficient water is present to effect a dissolution of a portion of the feed. The bulk density of the final product also tends to be reduced by decreasing the weighted average particle size of the moisturization step feed.

The term "water" is to be understood to mean pure water, or water containing minor amounts, that is less than 15% by weight of STPP or other such polyphosphate salts. Water containing such minor amounts of STPP may be used when it is desired to recycle water in a commercial production plant obtained, for example, from pollution control equipment.

The temperature of the water sprayed is not critical, but it is preferably within the range of from 10° to 50° C. It is generally impractical to employ temperatures greater than 80° C. or temperatures below 5° C.

The moisturization step feed is subjected to agitation as the water is added. This effects a more uniform distribution of water on the feed and tends to agglomerate the feed, particularly any fines in the feed. Preferably, the moisturization step feed is agitated by rotation. Equipment in which the moisturization step may be carried out and which provide the preferred agitation include, for example, a rotary disc granulator and a rotating horizontal drum hydrator with lifting flights (see also equipment described in U.S. Pat. Nos. 3,154,496 and 3,625,902). Spraying is the most preferred method of water addition and may be done by any of the conventional spraying means, which include, for example, air atomized or pneumatic spray nozzles.

The moisturized product is then calcined to a temperature within the range of from about 300° C. to about 600° C., the temperature being selected to produce the desired Form I and/or Form II content in the final STPP product. Typically, times on the order of 5 to 45 minutes are employed in reaching the selected temperature but shorter or longer times may be used where desired. Although any suitable calciner may be employed, a rotary calciner is preferred.

A single reactor which sequentially effects the moisturization and calcination steps may be used, or a separate calciner and moisturizer may be employed. The former may be desired, for example, when a rotating horizontal drum agglomerator is used in the moisturization step. In such instances, calcination may be effected by directly or indirectly heating the rotating horizontal drum.

STPP particles in the hydrator and calciner exit gas streams are preferably recovered by, for example, a dry cyclone, and recycled to the moisturization step. Generally, such recycled material contains partially hydrated STPP particles which when mixed with the recycle from the product screens and the compacted and milled feed, provide a moisturization step feed having on the average between about 1 and 12% moisture.

The calcined granular STPP products of the invention are recovered, generally by screening the calcinate to isolate the desired product fraction. For commercial purposes the granular product fraction isolated is generally encompassed by the fraction −16 +100 mesh. Typical granular fractions isolated include, for example, −16 +94, −20 +80 and −20 +100 mesh. Such fractions are provided by the present invention. Preferably, recovery of the granular STPP product includes milling, then rescreening any product screen oversize material. Further, where a continuous process is employed, the product screen undersize material is preferably recycled to the moisturization step.

Granular STPP products were obtained from the above described process having low friability and high absorptivity values and having a bulk density within the range of from about 0.65–0.87 g/cc. The above described process can be carried out in either a batch or continuous fashion, as desired. Preferably, however, the invention is carried out as a continuous process.

The following examples are given to illustrate the invention and are not intended to be limiting thereof.

Friability Determination Procedure

Friability as described and reported herein is determined as follows:

Two approximately 65 g samples (Samples 1 and 2) from a homogenized portion of the product to be tested are weighed to the nearest 0.01 g. Sample 1 is transferred to the top screen of a nest including 20, 30 and 100 mesh (U.S. Standard) screens. The screen nest with sample is placed on a Ro Tap sieve shaker (manufactured by W. S. Tyler, Inc.) and shaken for 10 minutes. The amount of material which passed through the 100 mesh screen is weighed. The % by weight of Sample 1 which passed through the 100 mesh screen is then calculated.

Sample 2 is transferred to an essentially vertical, 1" (diameter)×24" glass tube. A nonporous, cupped device suitable for collecting dust (for example, a Soxlet extraction thimble) is fitted over the top opening of the glass tube preferably by means of a rubber tube.

Dry air is flown upwardly through the glass tube at a rate of 0.25 SCFM for a period of 10 minutes. The sample is thus fluidized and is maintained in a fluidized state for the 10 minute period. Thereafter, the material in the tube and in the dust collector is transferred to the top screen of a Ro Tap sieve shaker and treated in the same manner as Sample 1. Calculation is then made of the % by weight of Sample 2 which passed through the 100 mesh screen.

% Friability = % by weight of Sample 2 passed through 100 mesh screen - % by weight of Sample 1 passed through 100 mesh screen Absorptivity Determination Procedure Absorptivity as described and reported herein is determined as follows: Twenty grams of STPP sample to be tested are thoroughly mixed with 5 ml of an octylphenoxypolyethoxy ethanol wetting agent commercially sold as Triton ® X-100 in a 250 ml beaker. Approximately 20 g of dry granular light density (0.45–0.55 g/cc) STPP particles are placed in the bottom of a centrifuge tube to absorb any excess Triton ® X-100 not absorbed by the sample being tested. A perforated rubber stopper having a milk pad filter paper disc on the top thereof and an affixed wire handle, is slid down the tube and forced against the dry phosphate in the bottom of the tube. The mixture of sample being tested and Triton ® X-100 is then transferred to the centrifuge tube. The tube with contents are centrifuged at a speed of about 4,000 rpm for 10 minutes. The sample with absorbed Triton ® X-100, that is, the material on top of the rubber stopper, is removed from the centrifuge tube and weighed.

% absorptivity = $\dfrac{\text{Weight of sample with absorbed Triton ®X-100} - \text{initial sample weight}}{\text{Weight of sample with absorbed Triton ®X-100}} \times 100$

EXAMPLE I

About 40,000 pounds of STPP screen undersize particles obtained from a commercial spray drying process were fed to a Komarek-Greaves Model 20.5–9.2MS compactor at a rate of about 7,000 pounds per hour (pph). The screen undersize feed material had a bulk density of about 0.75 g/cc and contained about 50% by weight −20 +100 mesh particles, the major proportion of the balance comprising −100 mesh particles. The compacting pressure was 56,775 psig. After one pass through the compactor, the STPP was fed to a Fitzpatrick Model HAS-030 grinding mill. The milled product was screened to remove a portion of the −100 mesh particles therein, sufficient to provide a compacted and milled feed having from about 5 to about 20% −100 mesh particles.

A six and one half hour run (Run I) was made during which compacted and milled material thus prepared was continuously fed at a rate of about 500 pph to a rotary drum hydrator (27 inch inside diameter; 14 foot length; 0.2 inch per foot slope) equipped with four air atomized spray nozzles. The hydrator was rotated at a speed of 22 rpm. Water, having a temperature of about 13°–16° C., was sprayed onto the rotating bed of STPP at a rate sufficient to provide a calcination step feed having 26.0–34.1% by weight of moisture (bound and/or free). Values for the physical measurements made on selected samples of compacted and milled feed and calcination step feed taken during operation of the run are given in Table I. Run average and range values are given for each type of measurement.

The material from the hydrator was continuously fed to a countercurrent rotary calciner (15.5 inch inside diameter; 11 foot 1.5 inch length) rotated at a speed of about 27 rpm. Heating was effected by a natural gas flame at the material discharge point of the calciner. The moisturized feed was calcined to a temperature within the range of from about 440° to about 480° C. The calcined product was screened by a commercial screening operation employing 16 mesh top deck and 94 mesh bottom deck screens (product screens). Oversize material from the product screens was continuously milled and recycled to the product screens. A −16+94 mesh product fraction is recovered from the product screens.

Particle size distribution, bulk density, absorptivity, friability, STPP assay and Form I content measurements were made on selected samples (taken at various times during operation of the run) of the −16 +94 mesh product fraction. Run average and range values are given in Table I for each type of measurement.

As can be seen from the data, granular STPP products of high absorptivity, low friability and a bulk density within the range 0.742–0.793 g/cc were obtained.

EXAMPLE II

The equipment and procedure employed in this example are identical to Example I except that process undersize STPP from the product screens and dry cyclone (collects undersize STPP from the hydrator and calciner exit gas streams) was continuously recycled to the moisturization step. Thus, the compacted and milled feed together with the recycle constituted the moisturization step feed.

One continuous 12 hour run was made during which compacted and milled STPP prepared as in Example I, was fed to the hydrator at a rate of about 500 pph. Process undersize STPP was continuously recycled to the moisturization step at an estimated average rate of about 125 pph. The recycle from the cyclone contained some hydrated STPP material which, when combined with the product screen recycle and compacted and milled feed, produced a moisturization step feed having about 1 to 5% by weight of moisture.

The hydrator was rotated at a speed of 22 rpm. Water having a temperature of about 13°–16° C. was sprayed onto the rotating bed of STPP at a rate sufficient to provide a calcination step feed having 21.6–31.8% by weight of moisture (bound and/or free).

Values for the physical measurements made on selected samples of compacted and milled feed and calcination step feed, taken during operation of the run, are given in Table II. Run average and range values are given for each type of measurement.

The moisturized products were calcined to a temperature within the range of from about 325° to about 545° C., in the manner described in Example I. The calcined products were then screened as in Example I, and the product screen oversize material was continuously milled and recycled to the product screens. Product screen undersize material and undersize material from the hydrator and calciner exit gas streams (collected in a dry cyclone) were continuously recycled to the moisturization step.

Particle size distribution, bulk density, absorptivity, friability, STPP assay and Form I content measurements were made on selected samples (taken at various times during operation of the run) of the −16 mesh +94 mesh product fraction. Run average and range values are given in Table II for each type of measurement.

As can be seen from the data, granular STPP products of high absorptivity, low friability and a bulk density within the range 0.696–0.868 g/cc were obtained. Further, the % assay of STPP increased by an average of about 5.3% in carrying out the process.

EXAMPLE III

Like the previous examples, the run of this example (Run III) employed a spray dried screen undersize STPP as feed to the compactor and, like Example II, all process undersize STPP was continuously recycled. This example differs from Examples I and II in that the compacted and milled STPP material is unscreened. As a consequence, the moisturization step feed contains a greater proportion of −100 mesh material than the corresponding feeds in the previous examples.

Spray dried screen undersize STPP having a bulk density of about 0.71 g/cc and containing about 45% by weight −50 +100 mesh particles and about 48% by weight −100 mesh particles was compacted as described in Example I. After one pass through the compactor, the STPP was fed to a Fitzpatrick Model HAS-030 mill. The milled product contained on the average, about 20% −50 +100 mesh and about 39% −100 mesh STPP particles.

A continuous 40 hour run was made during which compacted and milled STPP thus prepared was continuously fed at a rate of about 300 pph to a rotary drum hydrator identical to that described in Example I. Process undersize STPP was continuously recycled to the moisturization step. The recycle rate from the product screens was about 35 pph and from the dry cyclone about 370 pph. The recycle from the cyclone contained some hydrated STPP material which when combined with the product screen recycle and compacted and milled feed, produced a moisturization step feed having an average of 5.1% by weight of moisture.

The hydrator was rotated at a speed of 22 rpm. Water, having a temperature of about 13°–16° C. was sprayed onto the rotating bed of STPP at a rate sufficient to provide a calcination step feed having 20.0 to 27.6% by weight of moisture (bound and/or free).

Values for the physical measurements made on selected samples of compacted and milled feed, moisturization step feed and calcination step feed, taken during operation of the run, are given in Table III. Run average and range values are given for each type of measurement.

The moisturized products were calcined to a temperature within the range of from about 440° to about 480° C., in the manner described in Example I. The calcined products were then screened by a commercial screening operation employing 16 mesh top deck and 94 mesh bottom deck screens. Product screen oversize material was continuously milled and recycled to the product screens. Product screen undersize material and undersize material (collected in a dry cyclone) from the hydrator and calciner exit gas streams were continuously recycled to the moisturization step. The average product yield, based on the compacted and milled STPP fed, was about 84%.

Particle size distribution, bulk density, absorptivity, friability and STPP assay measurements were made on selected samples (taken at various times during operation of the run) of the −16 +94 mesh product fraction. Run average and range values are given in Table III for each type of measurement.

As can be seen from the data, granular STPP products of high absorptivity, low friability and a bulk density within the range 0.752–0.818 g/cc were obtained.

EXAMPLE IV

This example demonstrates the process of the invention using rotary dried screen undersize STPP particles obtained from a commercial plant.

Three laboratory scale batch runs (Runs IV, V and VI) were made using as the feed a rotary dried STPP compacted and milled following the procedure described in Example I. The compacted and milled feed was unscreened and contained about 25% by weight −50 +100 mesh particles and about 18% by weight −100 mesh particles.

In each of the three runs, about 600 grams of compacted and milled STPP thus prepared were placed in a flat tray. The feed was agitated by stirring and at the same time moisturized by spraying a sufficient amount of room temperature water thereon to provide a calcination step feed having from about 18.0 to 20.5% by weight of moisture (bound and/or free). The spraying was done with an air atomized, hand pumped spray bottle.

Values for the physical measurements made on the compacted and milled feed and calcination step feed are given in Table IV.

The moisturized products were transferred to 3½ inch deep, 4½ inch by 4½ inch trays and calcined to a temperature of 550° C. in a muffle furnace.

The calcined products were screened to isolate the −20 +100 mesh product fractions. Particle size distribution, bulk density, absorptivity, friability, STPP assay and Form I content measurements were made on this product fraction. Values for these measurements are given in Table IV.

As can be seen from the data, granular STPP products of high absorptivity, low friability and a bulk density within the range 0.728–0.755 g/cc were obtained. Further, the % assay of STPP increased by an average of about 6.4%.

EXAMPLE V

A run (Run VII) was made repeating Example IV except that the compacted and milled feed was sprayed with a 5% aqueous solution of STPP instead of pure water. The amount of solution sprayed was sufficient to provide a calcination step feed having 18.2% by weight of moisture (bound and/or free).

The moisturized product was calcined to a temperature of 550° C.

Particle size distribution, bulk density, absorptivity, friability, STPP assay and Form I content measurements were made on the screened −20 +100 mesh product fraction. Values for these measurements are given in Table V.

As can be seen from the data, a granular STPP product of high absorptivity, low friability and a bulk density of 0.757 g/cc was obtained. Further, the % assay of STPP increased by 7.0%.

TABLE I

PRODUCTION OF GRANULAR STPP PRODUCTS FROM COMPACTED SPRAY DRIED SCREEN UNDERSIZE STPP (WITHOUT RECYCLE OF PROCESS UNDERSIZE MATERIAL AND WITH A SCREENED COMPACTED AND MILLED FEED)

Part I: Run I Particle Size Distribution Measurements

| STPP | | % by Weight Through Indicated U.S. Standard Screens | | | | | |
|------|---|------|------|------|------|------|------|
| | | +12 | +16 | +20 | +30 | +50 | +100 |
| CM | a | 2.9 | 11.4 | 30.9 | 46.9 | 76.8 | 89.9 |
| | r | 1.8–4.0 | 7.4–15.3 | 22.4–39.4 | 36.6–57.2 | 70.2–83.4 | 83.6–92.6 |
| P | a | .01 | 0.04 | 11.1 | 44.0 | 79.0 | 97.4 |
| | r | 0.00–0.02 | 0.00–0.10 | 1.5–18.1 | 36.6–50.6 | 74.3–86.8 | 96.5–98.8 |

Part II: Run I Other Physical Measurements

| STPP | | % Moisture | g/cc Bulk Density | % Absorptivity | % Friability | % Form I | % Assay STPP |
|------|---|---|---|---|---|---|---|
| CM | a | | 1.108 | | | | |
| | r | | 1.084.–1.132 | | | | |
| C | a | 28.2 | | | | | |
| | r | 26.0–34.1 | | | | | |
| P | a | | 0.771 | 21.7 | 8.9 | 26.0 | 94.0 |
| | r | | 0.742–0.793 | 20.4–21.9 | 8.3–9.0 | 24.8–28.2 | 91.2–95.1 |

CM = Compacted and Milled Feed
C = Calcination Step Feed
P = −16 +94 Mesh Product Fraction
a = Average
r = Range

TABLE II

PRODUCTION OF GRANULAR STPP PRODUCTS FROM COMPACTED, SPRAY DRIED SCREEN UNDERSIZE STPP (WITH RECYCLE OF PROCESS UNDERSIZE MATERIAL AND A SCREENED COMPACTED AND MILLED FEED)

Part I: Run II Particle Size Distribution Measurements

% by Weight Through Indicated U.S. Standard Screens

TABLE II-continued

PRODUCTION OF GRANULAR STPP PRODUCTS FROM COMPACTED, SPRAY DRIED SCREEN UNDERSIZE STPP (WITH RECYCLE OF PROCESS UNDERSIZE MATERIAL AND A SCREENED COMPACTED AND MILLED FEED)

| STPP | | +12 | +16 | +20 | +30 | +50 | +100 |
|---|---|---|---|---|---|---|---|
| CM | a | 2.6 | 6.1 | 17.1 | 37.6 | 81.3 | 94.2 |
| | r | 2.5–2.7 | 4.4–7.7 | 13.8–20.4 | 35.5–39.6 | 81.2–81.3 | 94.1–94.3 |
| P | a | .07 | .18 | 10.3 | 40.9 | 88.7 | 99.6 |
| | r | 0.00–0.30 | 0.01–0.60 | 6.1–21.5 | 33.8–58.7 | 74.4–96.4 | 98.6–99.9 |

Part II: Run II Other Physical Measurements

| STPP | | % Moisture | g/cc Bulk Density | % Absorptivity | % Friability | % Form I | % Assay STPP |
|---|---|---|---|---|---|---|---|
| CM | a | | 0.960 | | | 22.9 | 88.2 |
| | r | | 0.909–1.010 | | | 21.3–24.5 | 85.3–91.1 |
| C | a | 26.5 | | | | | |
| | r | 21.6–31.8 | | | | | |
| P | a | | 0.790 | 20.6 | 5.9 | 32.7 | 93.5 |
| | r | | 0.696–0.868 | 17.8–22.1 | 4.9–8.1 | 17.3–61.4 | 93.0–94.7 |

C = Compacted and Milled Feed
C = Calcination Step Feed
P = −16 +94 Mesh Product Fraction
a = Average
r = Range

TABLE III

PRODUCTION OF GRANULAR STPP PRODUCTS FROM COMPACTED SPRAY DRIED SCREEN UNDERSIZE STPP (WITH RECYCLE OF PROCESS UNDERSIZE MATERIAL AND AN UNSCREENED COMPACTED AND MILLED FEED)

Part I: Run III Particle Size Distribution Measurements

| | | % by Weight Through Indicated U.S. Standard Screens | | | | | |
|---|---|---|---|---|---|---|---|
| STPP | | +12 | +16 | +20 | +30 | +50 | +100 |
| CM | a | 5.1 | 12.6 | 22.5 | 29.8 | 41.0 | 61.2 |
| | r | 2.2–14.5 | 8.4–28.0 | 16.3–40.2 | 23.4–46.7 | 35.7–55.5 | 55.5–89.2 |
| MS | a | 4.4 | 13.3 | 25.2 | 35.9 | 57.1 | 74.0 |
| | r | 2.7–6.6 | 7.8–18.3 | 13.9–33.4 | 19.2–48.1 | 32.8–75.8 | 50.9–89.0 |
| P | a | 0.02 | 0.07 | 2.3 | 23.2 | 77.3 | 97.7 |
| | r | 0.01–.10 | 0.01–.10 | 0.7–11.6 | 17.3–32.0 | 69.9–84.5 | 92.8–99.1 |

Part II: Run III Other Physical Measurements

| STPP | | % Moisture | g/cc Bulk Density | % Absorptivity | % Friability | % Assay STPP |
|---|---|---|---|---|---|---|
| CM | a | | 1.04 | | | |
| | r | | 1.01–1.11 | | | |
| MS | a | 5.1 | 0.927 | | | |
| | r | 2.0–10.7 | 0.866–0.999 | | | |
| C | a | 25.0 | | | | |
| | r | 20.0–27.6 | | | | |
| P | a | | 0.786 | 18.7 | 15.4 | 94.42 |
| | r | | 0.752–0.818 | 17.6–19.6 | 14.3–17.4 | 92.1–96.0 |

CM = Compacted and Milled Feed
MS = Moisturization Step Feed
C = Calcination Step Feed
P = −16 +94 Mesh Product Fraction
a = Average
r = Range

TABLE IV

PRODUCTION OF GRANULAR STPP PRODUCTS FROM COMPACTED ROTARY DRIED SCREEN UNDERSIZE STPP (WITHOUT RECYCLE OF PROCESS UNDERSIZE MATERIAL AND WITH AN UNSCREENED COMPACTED AND MILLED FEED)

Part I: Particle Size Distribution Measurements

| | | % by Weight Through Indicated U.S. Standard Screens | | | | |
|---|---|---|---|---|---|---|
| STPP | Run | +12 | +20 | +30 | +50 | +100 |
| CM | IV,V,VI | 0.05 | 12.2 | 26.5 | 56.8 | 81.7 |
| | IV | 0.00 | 0.5 | 47.8 | 89.4 | 99.8 |
| P | V | 0.00 | 0.6 | 32.1 | 75.9 | 99.3 |
| | VI | 0.00 | 0.80 | 37.3 | 80.1 | 99.1 |

Part II: Other Physical Measurements

| STPP | Run | % Moisture | g/cc Bulk Density | % Absorptivity | % Friability | % Form I | % Assay STPP |
|---|---|---|---|---|---|---|---|
| CM | IV | | 1.077 | | | 8.2 | 83.9 |

TABLE IV-continued

PRODUCTION OF GRANULAR STPP PRODUCTS FROM COMPACTED ROTARY DRIED SCREEN UNDERSIZE STPP (WITHOUT RECYCLE OF PROCESS UNDERSIZE MATERIAL AND WITH AN UNSCREENED COMPACTED AND MILLED FEED)

|   |     |      |       |      |     |      |      |
|---|-----|------|-------|------|-----|------|------|
|   | V   | "    |       | "    | "   | "    |      |
|   | VI  | "    |       |      |     | "    | "    |
|   | IV  | 20.5 |       |      |     |      |      |
| C | V   | 18.5 |       |      |     |      |      |
|   | VI  | 18.0 |       |      |     |      |      |
|   | IV  |      | 0.728 | 21.9 | 5.9 | 32.4 | 92.1 |
| P | V   |      | 0.755 | 20.6 | 4.0 | 29.4 | 90.9 |
|   | VI  |      | 0.755 | 21.3 | 4.9 | 26.6 | 90.0 |

CM = Compacted and Milled Feed
C = Calcination Step Feed
P = −20 +100 Mesh Product Fraction

TABLE V

PRODUCTION OF GRANULAR STPP PRODUCTS FROM COMPACTED ROTARY DRIED SCREEN UNDERSIZE STPP USING SOLUTION SPRAYING (WITHOUT RECYCLE OF PROCESS UNDERSIZE MATERIAL AND WITH AN UNSCREENED COMPACTED AND MILLED FEED)

Part I: Run VII Size Distribution Measurements

| STPP | % by Weight Through Indicated U.S. Standard Screens | | | | |
|------|------|------|------|------|------|
|      | +12  | +20  | +30  | +50  | +100 |
| CM   | 0.05 | 12.2 | 26.5 | 56.8 | 81.7 |
| P    | 0.00 | 0.8  | 34.3 | 80.1 | 99.2 |

Part II: Run VII Physical Measurements

| STPP | % Moisture | g/cc Bulk Density | % Absorptivity | % Friability | % Form 1 | % Assay STPP |
|------|------------|-------------------|----------------|--------------|----------|--------------|
| CM   |            | 1.077             |                |              | 8.2      | 83.9         |
| C    | 18.2       |                   |                |              |          |              |
| P    |            | 0.757             | 21.0           | 5.0          | 26.5     | 90.0         |

CM = Compacted and Milled Feed
C = Calcination Step Feed
P = −20 +100 Mesh Product

We claim:

1. A process for producing a granular sodium tripolyphosphate product having low friability, high absorptivity, and a bulk density within the range of from about 0.65 g/cc to about 0.87 g/cc, which comprises compacting screen undersize sodium tripolyphosphate particles, milling the compacted particles, recovering a compacted and milled feed having a particle size distribution of at least 15% by weight +50 mesh, 0 to 50% by weight −50 +100 mesh and 0 to 50% by weight −100 mesh, moisturizing the compacted and milled feed by adding a sufficient amount of water thereon to produce a moisturized material containing on the average between 15 and 35% by weight moisture, agitating the material being moisturized, calcining the moisturized material to a temperature within the range of from about 300° to about 600° C. and recovering said granular sodium tripolyphosphate product.

2. The process of claim 1 wherein the screen undersize sodium tripolyphosphate particles are spray dried particles.

3. The process of claim 1 wherein the screen undersize sodium tripolyphosphate particles are rotary dried particles.

4. The process of claim 1 wherein the screen undersize sodium tripolyphosphate particles have a size distribution of at least 25% by weight −100 mesh, 0 to 65% by weight −50 +100 mesh and 0 to 10% by weight +50 mesh.

5. The process of claim 1 wherein the screen undersize sodium tripolyphosphate particles are compacted under a compaction pressure within the range of from about 35,000 psig to about 60,000 psig.

6. The process of claim 1 wherein the compacted and milled feed has a particle size distribution of 40 to 85% by weight +50 mesh, 10 to 30% by weight −50 +100 mesh, and 15 to 40% by weight −100 mesh.

7. The process of claim 1 wherein the compacted and milled feed is a screened material having from about 5 to about 20% by weight −100 mesh particles therein.

8. The process of claim 1 wherein the compacted and milled feed is agitated by rotation.

9. The process of claim 1 wherein the water is added onto the agitated compacted and milled feed by spraying.

10. The process of claim 1 wherein the granular sodium tripolyphosphate product recovered is encompassed by the fraction −16 +100 mesh.

11. A continuous process for producing a granular sodium tripolyphosphate product having low friability, high absorptivity and a bulk density within the range of from about 0.65 g/cc to about 0.87 g/cc, which comprises continuously compacting screen undersize sodium tripolyphosphate particles, continuously milling the compacted particles, continuously recovering a compacted and milled feed having a particle size distribution of at least 15% by weight +50 mesh, 0 to 50% by weight −50 +100 mesh and 0 to 50% by weight −100 mesh, continuously moisturizing the compacted and milled feed by adding a sufficient amount of water thereon to continuously produce a moisturized material containing between 15 and 35% by weight moisture, continuously agitating the material being moisturized, continuously calcining the moisturized material to a temperature within the range of from about 300° to about 600° C. and continuously recovering said granular sodium tripolyphosphate product.

12. The process of claim 11 wherein the screen undersize sodium tripolyphosphate particles are spray dried particles.

13. The process of claim 11 wherein the screen undersize sodium tripolyphosphate particles are rotary dried particles.

14. The process of claim 11 wherein the screen undersize sodium tripolyphosphate particles have a size distribution of at least 25% by weight −100 mesh, 0 to 65% by weight −50 +100 mesh and 0 to 10% by weight +50 mesh.

15. The process of claim 11 wherein the screen undersize sodium tripolyphosphate particles are compacted under a compaction pressure within the range of from about 35,000 psig to about 60,000 psig.

16. The process of claim 11 wherein the compacted and milled feed has a particle size distribution of 40 to 85% by weight +50 mesh, 10 to 30% by weight −50 +100 mesh, and 15 to 40% by weight −100 mesh.

17. The process of claim 11 wherein the compacted and milled feed is a screened material having from about 5 to about 20% by weight −100 mesh particles therein.

18. The process of claim 11 wherein the compacted and milled feed is agitated by rotation.

19. The process of claim 11 wherein the water is added onto the agitated compacted and milled feed by spraying.

20. The process of claim 11 wherein the granular sodium tripolyphosphate product recovered is encompassed by the fraction −16 to +100 mesh.

21. A continuous process for producing a granular sodium tripolyphosphate product having low friability, high absorptivity, and a bulk density within the range of from about 0.65 g/cc to about 0.87 g/cc, which comprises continuously compacting screen undersize sodium tripolyphosphate particles, continuously milling the compacted particles, continuously recovering a compacted and milled feed having a particle size distribution of at least 15% by weight +50 mesh, 0 to 50% by weight −50 +100 mesh and 0 to 50% by weight −100 mesh, continuously moisturizing the compacted and milled feed and recycled process undersize material by adding a sufficient amount of water thereon to continuously produce a moisturized material containing between 15 and 35% by weight moisture, continuously agitating the material being moisturized, continuously calcining the moisturized material to a temperature within the range of from about 300° C. to about 600° C., continuously recovering said granular tripolyphosphate product, and continuously recycling process undersize material to the moisturization step.

22. The process of claim 21 wherein the screen undersize sodium tripolyphosphate particles are spray dried particles.

23. The process of claim 21 wherein the screen undersize sodium tripolyphosphate particles are rotary dried particles.

24. The process of claim 21 wherein the screen undersize sodium tripolyphosphate particles have a size distribution of at least 25% by weight −100 mesh, 0 to 65% by weight −50 +100 mesh and 0 to 10% by weight +50 mesh.

25. The process of claim 21 wherein the screen undersize sodium tripolyphosphate particles are compacted under a compaction pressure of from about 35,000 psig to about 60,000 psig.

26. The process of claim 21 wherein the compacted and milled feed has a particle size distribution of 40 to 85% by weight +50 mesh, 10 to 30% by weight −50 +100 mesh and 15 to 40% by weight −100 mesh.

27. The process of claim 21 wherein the compacted and milled feed is a screened material having from about 5 to about 20% by weight −100 mesh particles therein.

28. The process of claim 21 wherein the compacted and milled feed is agitated by rotation.

29. The process of claim 21 wherein the water is added onto the agitated compacted and milled feed by spraying.

30. The process of claim 21 wherein the granular sodium tripolyphosphate product recovered is encompassed by the fraction −16 +100 mesh.

31. A process for producing a granular sodium tripolyphosphate product having low friability, high absorptivity, and a bulk density within the range of from about 0.65 g/cc to about 0.87 g/cc, which comprises compacting screen undersize sodium tripolyphosphate particles, milling the compacted particles, recovering a compacted and milled feed having a particle size distribution of at least 15% by weight +50 mesh, 0 to 50% by weight −50 +100 mesh and 0 to 50% by weight −100 mesh, moisturizing the compacted and milled feed by adding a sufficient amount of water thereon to produce an agglomerated material containing on the average between 15 and 35% by weight moisture, agitating the material being moisturized by rotation, calcining the agglomerated material to a temperature within the range of from about 300° to about 600° C. and recovering said granular sodium tripolyphosphate product.

* * * * *

UNITED STATES PATENT AND TRADEMARK OFFICE
CERTIFICATE OF CORRECTION

PATENT NO. : 4,251,498
DATED : February 17, 1981
INVENTOR(S) : Paul L. Hensler, Delmar F. Church & Robert W. Beger It is certified that error appears in the above—identified patent and that said Letters Patent is hereby corrected as shown below:

Column 11, Table II continued, footnote, "C = Compacted and Milled Feed" should read --CM = Compacted and Milled Feed--. Column 11-12, Table IV, Part II, Other Physical Measurements, "70 Form I" should read --% Form I--.

Signed and Sealed this

Sixth Day of October 1981

[SEAL]

Attest:

GERALD J. MOSSINGHOFF

Attesting Officer

Commissioner of Patents and Trademarks